United States Patent
Ho et al.

(10) Patent No.: US 9,942,800 B2
(45) Date of Patent: Apr. 10, 2018

(54) LOAD BALANCING IN A WIRELESS NETWORK WITH MULTIPLE ACCESS POINTS

(71) Applicant: QUALCOMM Incorporated, San Diego, CA (US)

(72) Inventors: Sai Yiu Duncan Ho, San Diego, CA (US); Peerapol Tinnakornsrisuphap, San Diego, CA (US); Brian Michael Buesker, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/474,734

(22) Filed: Mar. 30, 2017

(65) Prior Publication Data

US 2017/0208502 A1    Jul. 20, 2017

Related U.S. Application Data

(62) Division of application No. 14/857,498, filed on Sep. 17, 2015, now Pat. No. 9,642,040.
(Continued)

(51) Int. Cl.
*H04W 72/00* (2009.01)
*H04W 28/08* (2009.01)
(Continued)

(52) U.S. Cl.
CPC ......... *H04W 28/085* (2013.01); *H04W 24/10* (2013.01); *H04W 40/12* (2013.01); *H04W 88/08* (2013.01)

(58) Field of Classification Search
CPC ... H04W 28/085; H04W 24/10; H04W 40/12; H04W 88/08
(Continued)

(56) References Cited

U.S. PATENT DOCUMENTS

| 6,038,599 A | 3/2000 | Black et al. |
| 7,583,677 B1 | 9/2009 | Ma et al. |

(Continued)

FOREIGN PATENT DOCUMENTS

| CN | 102149138 | 8/2011 |
| WO | 2013116988 | 8/2013 |

(Continued)

OTHER PUBLICATIONS

"Optimizing Microsoft Lync Deployments on Extreme Networks IdentiFi Wireless," Solution Deployment Guide and 802.11ac/802.11n Qualification Test Results, Aug. 2014, 19 pages.
(Continued)

*Primary Examiner* — Khai M Nguyen
(74) *Attorney, Agent, or Firm* — Qualcomm Inc (DL)

(57) ABSTRACT

This disclosure provides systems, methods and apparatus, including computer programs encoded on computer storage media, for load balancing network traffic in a wireless network. In one aspect, an access point may determine a plurality of client devices that are associated with an overloaded channel of the wireless network. The access point may identify a first client device of the plurality of client devices based, at least in part, on an airtime consumed on the overloaded channel. The access point may determine one or more alternate paths between the access point and the first client device. The access point may forecast airtime to be used by the first client device on channels of the one or more alternate paths, and steer wireless network traffic of the first client device to a first alternate path of the one or more
(Continued)

alternate paths based, at least in part, on the forecasted airtime.

20 Claims, 10 Drawing Sheets

Related U.S. Application Data

(60) Provisional application No. 62/053,021, filed on Sep. 19, 2014.

(51) Int. Cl.
*H04W 24/10* (2009.01)
*H04W 40/12* (2009.01)
*H04W 88/08* (2009.01)

(58) Field of Classification Search
USPC .................... 455/453, 450, 452.1, 452.2
See application file for complete search history.

(56) References Cited

U.S. PATENT DOCUMENTS

| | | | |
|---|---|---|---|
| 7,797,018 | B2 | 9/2010 | Chandra |
| 7,836,181 | B2 | 11/2010 | Bejerano et al. |
| 7,936,676 | B2 | 5/2011 | Cromer et al. |
| 8,072,952 | B2 | 12/2011 | Aragon et al. |
| 8,842,578 | B1 | 9/2014 | Zisapel et al. |
| 9,642,040 | B2 | 5/2017 | Ho et al. |
| 2005/0208949 | A1 | 9/2005 | Chiueh |
| 2008/0125163 | A1 | 5/2008 | Chi |
| 2009/0103453 | A1 | 4/2009 | Hand et al. |
| 2010/0091669 | A1 | 4/2010 | Liu et al. |
| 2011/0090949 | A1 | 4/2011 | Gu |
| 2011/0141999 | A1 | 6/2011 | Karlsson et al. |
| 2011/0225311 | A1 | 9/2011 | Liu et al. |
| 2011/0225312 | A1 | 9/2011 | Liu et al. |
| 2011/0277009 | A1 | 11/2011 | Damola et al. |
| 2013/0225181 | A1* | 8/2013 | Radulescu ............ H04W 36/22 455/442 |
| 2013/0336200 | A1 | 12/2013 | Andreozzi et al. |
| 2014/0059218 | A1* | 2/2014 | Ganu .................... H04W 76/04 709/224 |
| 2014/0073319 | A1 | 3/2014 | Navalgund |
| 2014/0204802 | A1 | 7/2014 | Han et al. |
| 2014/0211632 | A1* | 7/2014 | Saad ....................... H04L 45/62 370/238 |
| 2014/0269632 | A1 | 9/2014 | Blankenship et al. |
| 2015/0085699 | A1 | 3/2015 | Ho et al. |
| 2015/0103730 | A1* | 4/2015 | Emmanuel ........ H04W 28/0215 370/315 |
| 2015/0119035 | A1* | 4/2015 | Ganu .................... H04W 36/30 455/436 |
| 2016/0088521 | A1 | 3/2016 | Ho et al. |

FOREIGN PATENT DOCUMENTS

| | | |
|---|---|---|
| WO | 2014145073 | 9/2014 |
| WO | 2016044724 | 3/2016 |

OTHER PUBLICATIONS

"PCT Application No. PCT/US2015/050939 International Search Report", dated Mar. 31, 2016, 19 pages.

"Radio Resource Management in HiveOS," Aerohive Networks solution brief, Mar. 7, 2015, 8 pages.

"Taiwan Search Report—TW104130994", dated Sep. 18, 2017, 1 page.

"U.S. Appl. No. 14/857,498 Office Action", dated Sep. 1, 2016, 9 pages.

Athanasiou, et al., "LAC: Load-aware channel selection in 802.11 WLANs", Personal, Indoor and Mobile Radio Communications, 2008, Sep. 15, 2008, pp. 1-6.

Gong, et al., "Load and Interference-Aware Channel Assignment for Dual-Radio Mesh Backhauls", IEEE Global Telecommunications Conference: [IEEE Globecom 2008]; New Orleans, LA; Nov. 30, 2008-Dec. 4, 2008; IEEE, Piscataway, NJ, USA, Nov. 30, 2008, pp. 1-6.

* cited by examiner

LOAD BALANCING IN A WIRELESS NETWORK WITH MULTIPLE ACCESS POINTS

CROSS-REFERENCE TO RELATED APPLICATIONS

This Patent Application is a divisional of U.S. application Ser. No. 14/857,498 filed on Sep. 17, 2015, which claims priority to U.S. Provisional Application Ser. No. 62/053,021 filed on Sep. 19, 2014. The prior Applications are assigned to the assignee hereof, and the disclosures of the prior Applications are considered part of and are incorporated by reference in this Patent Application.

BACKGROUND

The disclosed subject matter generally relates to the field of communications. More specifically, the subject matter relates to load balancing wireless network traffic.

A wireless access point ("AP") provides network connectivity for wireless devices. The AP may be part of a gateway or router, or it may be a standalone device. The range of the AP is impacted by the surrounding environment and capability of the AP itself. A range extender may be used to extend the range of the AP. The range extender may rebroadcast the signals from the AP, which allows wireless devices out of range of the AP to communicate with the AP via the range extender.

SUMMARY

The systems, methods and devices of this disclosure each have several innovative aspects, no single one of which is solely responsible for the desirable attributes disclosed herein.

One innovative aspect of the subject matter described in this disclosure can be implemented in an access point (AP) for load balancing network traffic. The AP may determine a plurality of client devices that are associated with an overloaded channel of a wireless network. The AP may identify a first client device of the plurality of client devices based, at least in part, on an airtime consumed on the overloaded channel. The AP may determine one or more alternate paths between the AP and the first client device. The AP may forecast airtime to be used by the first client device on channels of the one or more alternate paths. The AP may steer wireless network traffic of the first client device to a first alternate path of the one or more alternate paths based, at least in part, on the forecasted airtime.

In some implementations, the AP may detect the overloaded channel of the wireless network, determine the airtime on the overloaded channel consumed by each of the plurality of client devices, determine the first client device consumes the most airtime on the overloaded channel, and identify the first client device based, at least in part, on determining the first client device consumes the most airtime on the overloaded channel.

In some implementations, the AP may determine whether the overloaded channel remains overloaded after steering the wireless network traffic of the first client device. In response to determining the overloaded channel remains overloaded, the AP may identify a second client device of the plurality of client devices that are associated with the overloaded channel based, at least in part, on the airtime consumed on the overloaded channel, and determine one or more alternate paths between the AP and the second client device for steering wireless network traffic of the second client device away from the overloaded channel.

In some implementations, the AP may differentiate the plurality of client devices that are associated with the overloaded channel into a first class and a second class based, at least in part, on priorities associated with the plurality of client devices, where client devices of the first class have lower priorities compared to client devices of the second class. The AP may determine the airtime on the overloaded channel consumed by each of the client devices of the first class including the first client device, and identify the first client device based, at least in part, on the airtime on the overloaded channel consumed by each of the client devices of the first class.

In some implementations, the AP may determine whether the overloaded channel remains overloaded after steering the wireless network traffic of the first client device of the first class. In response to determining the overloaded channel remains overloaded, the AP may identify a second client device of the client devices of the first class based, at least in part, on the airtime on the overloaded channel consumed by each of the client devices of the first class, and steer wireless network traffic of the second client device of the first class away from the overloaded channel.

In some implementations, the AP may determine whether the overloaded channel remains overloaded after steering the wireless network traffic of the first client device of the first class. In response to determining the overloaded channel remains overloaded, the AP may select one or more client devices of the first class that are associated with a receive signal strength measurement that is less than a threshold, and limit the airtime on the overloaded channel consumed by the one or more client devices of the first class In some implementations, the AP may steer wireless network traffic of each of the client devices of the first class away from the overloaded channel, determine whether the overloaded channel remains overloaded after steering the wireless network traffic of each of the client devices of the first class away from the overloaded channel, and steer wireless network traffic of at least one client device of the second class in response to determining the overloaded channel remains overloaded after steering the wireless network traffic of each of the client devices of the first class away from the overloaded channel.

Another innovative aspect of the subject matter described in this disclosure can be implemented in a network device, comprising a processor, and a memory having instructions stored therein which, when executed by the processor, cause the network device to determine a plurality of client devices that are associated with an overloaded channel of a wireless network, identify a first client device of the plurality of client devices based, at least in part, on an airtime consumed on the overloaded channel, determine one or more alternate paths between the network device and the first client device, forecast airtime to be used by the first client device on channels of the one or more alternate paths, and steer wireless network traffic of the first client device to a first alternate path of the one or more alternate paths based, at least in part, on the forecasted airtime.

Another innovative aspect of the subject matter described in this disclosure can be implemented in a network device comprising means for determining a plurality of client devices that are associated with an overloaded channel of a wireless network, means for identifying a first client device of the plurality of client devices based, at least in part, on an airtime consumed on the overloaded channel, means for determining one or more alternate paths between the network device and the first client device, means for forecasting airtime to be used by the first client device on channels of the one or more alternate paths, and means for steering wireless network traffic of the first client device to a first alternate path of the one or more alternate paths based, at least in part, on the forecasted airtime.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The present embodiments may be better understood by referencing the accompanying drawings.

DESCRIPTION OF EMBODIMENT(S)

Figure 1:
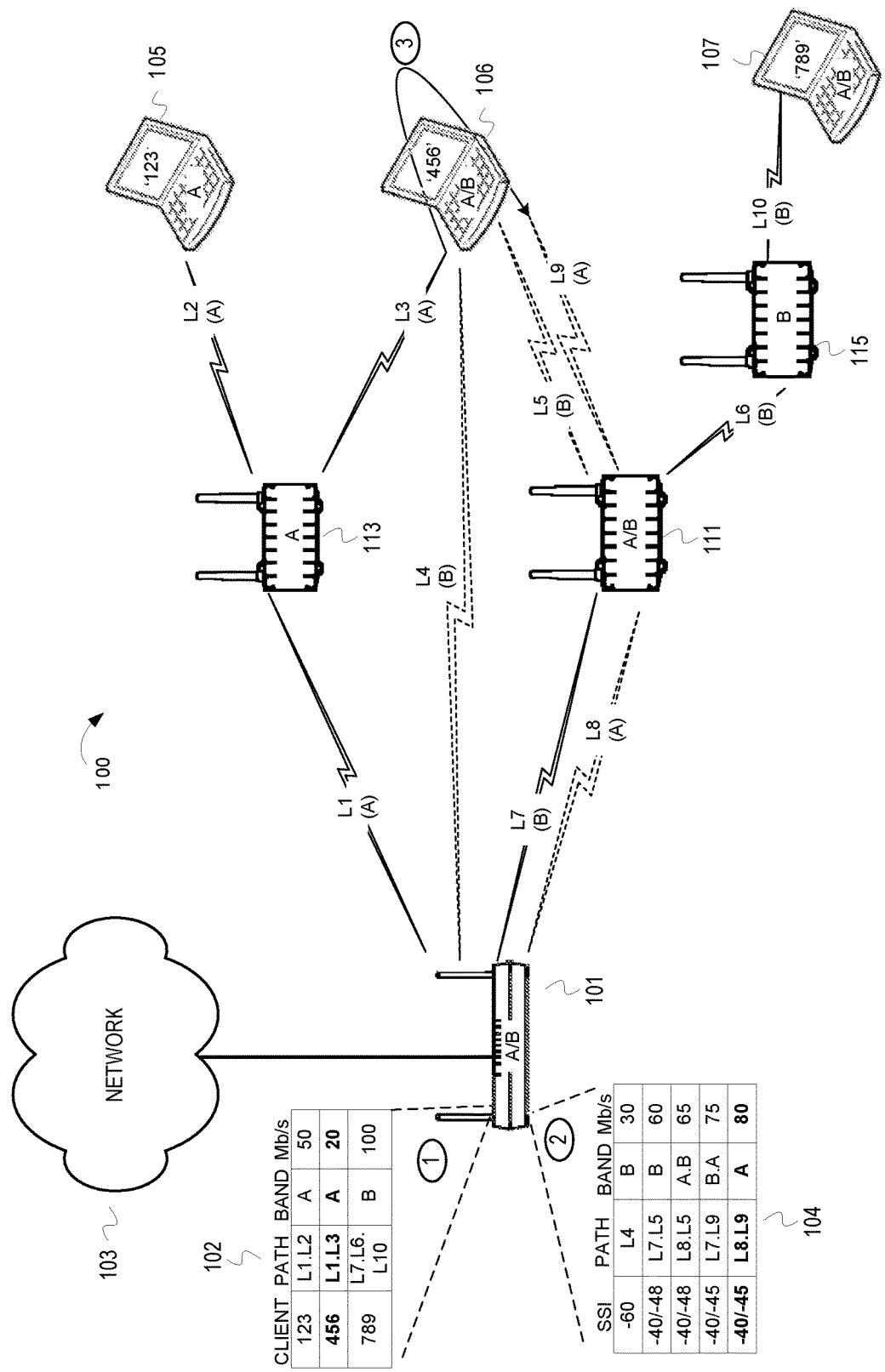
FIG. 1 illustrates an example of an AP steering traffic of a client device from an overloaded path to a different path for traffic load balancing.

The description that follows includes example systems, methods, techniques, and instruction sequences that embody techniques of this disclosure. However, it is understood that the described aspects may be practiced without these specific details. In other instances, well-known instruction instances, protocols, structures and techniques have not been shown in detail in order not to obfuscate the description.

Terminology

This description uses various terms, including a communication channel ("channel"), a communication band ("band"), a "link," and a "path." A "channel" refers to communication through a shared medium. For example, two devices may communicate over a channel using orthogonal frequency-division multiplexing (OFDM) through a shared medium. A "band" refers to a portion of a shared medium that is used for communication. A single band may include multiple channels, although a channel may exist independent of any defined band. A band may be identified to apply a particular communication protocol to a group of channels within the band and control interference between channels. In the context of wireless radio frequency communication, a band is a range of frequencies used for modulating data onto radio signals, and a channel is a particular frequency within that band. The two devices may communicate using multiple OFDM channels by using multiple frequencies in a certain band.

A "link" is used herein to refer to a logical connection between two endpoint devices. A link is defined by the endpoints, as well as the channel and/or communication protocol used. Different links may be in the same channel. Different links may be in different channels. Multiple links may be established between the same endpoint devices. A "path" is used herein to refer to a logical connection between two endpoint devices that may include one or more links. For example, a path between devices A and C may include a first link from device A to device B, and a second link from the device B to device C.

This description also uses broad terms to identify network devices. For instance, an AP refers to a category of network devices that provide wireless access to a wireless network. This category of network devices includes devices with multiple names (e.g., wireless range extenders, wireless range expanders, relays, repeaters). This description refers to an AP that extends or expands the range of another AP as a "range extender." A range extender may be referred to as an intermediate AP. An AP that interfaces a wireless network with another network may be referred to as a root AP. A root AP may be incorporated into a bridge, a router, a gateway, or the like. Furthermore, a network device may have different roles within the same wireless network. As an example, a network device may be a router, a root AP, and/or an intermediate AP, depending on configuration and/or operating mode.

Overview

With multiple channels available and range extenders, a number of wireless paths may be available for communicating traffic in a wireless network. Traffic on wireless paths in the wireless network may be load balanced to improve channel utilization and/or relieve an overloaded channel. To load balance the traffic, a first AP may determine candidate paths between the first AP and a client device, wherein at least one of the candidate paths traverses a second AP. The first AP may determine available bandwidths of the candidate paths based, at least in part, on availability of channels of the candidate paths. The first AP may steer the traffic of the client device to a particular one of the candidate paths based, at least in part, on the available bandwidths.

Example Illustrations

FIG. 1 illustrates an example of an AP steering traffic of a client device from an overloaded path to a different path for traffic load balancing. FIG. 1 depicts a network 100 that includes an AP 101, an intermediate AP 111, an intermediate AP 113, an intermediate AP 115, and client devices 105-107, referred collectively as "devices." The AP 101 may provide the client devices 105-107 access to a network 103. The network 100 may be a wireless network, such as a local area network (LAN). The network 103 may be a wide area network (WAN).

Traffic of the client devices 105-107 refers to data communications that are transmitted or received by one or more of the client devices 105-107. Traffic of the client devices 105-107 is transmitted through the network 100. Traffic of the client devices 105-107 traverses different paths between the client devices 105-107 and the AP 101. Initially, traffic of the client device 105 traverses a path that includes a link L2 and a link L1 through the intermediate AP 113. Traffic of the client device 106 traverses a path that includes the link L3 and a link L1 through the intermediate AP 113. Traffic of the client device 107 traverses a path that includes a link L10, a link L6, and a link L7 through the intermediate AP 115 and the intermediate AP 111.

The AP 101 determines candidate paths to be used for possible steering of the client traffic. Each candidate path may include one or more candidate path links. FIG. 1 depicts links L1-L10, some of which may be candidate path links and/or established links. Some candidate path links may already be established between devices, and are referred to as established links. The established candidate path links of links L1-L3, L6, L7, and L10 are depicted with solid lines in FIG. 1. Other candidate path links may not yet be established between devices, and are referred to as non-established links. The non-established links of links L4, L5, L8, and L9 are depicted with dashed lines in FIG. 1. The non-established links may be established after a client device is selected for traffic steering. For example, a candidate path link L8 may be established between the AP 101 and the intermediate AP 111; a candidate path link L5 may be established between the intermediate AP 111 and the client device 106; and a candidate path link L3 may be already established between the intermediate AP 113 and the client device 106. In one embodiment, when link L5 is established between the client device 106 and the intermediate AP 111, the link L3 is disconnected between the client device 106 and the intermediate AP 113.

Each of the depicted devices in FIG. 1 is annotated with an indication of band capability. The bands are identified in FIG. 1 as band A and band B. For example, band A may identify a device that may operate in a 2.4 GHz band, and band B may identify a device that may operate in a 5 GHz band. Furthermore, bands A and B are described for example only, and additional and/or different bands may be used. The AP 101, the intermediate AP 111, the client device 106, and client device 107 are capable of communicating on a channel in band A and/or band B. The intermediate AP 113 and the client device 105 have a capability to communicate in band A, but not band B. Each of the links is also annotated to indicate the corresponding band of that link. For example, link L7 is annotated with (B), which indicates a B band of link L7.

FIG. 1 annotates each of the links and the client devices 105-107 with identifiers. These identifiers are used for the example data of table 102 and table 104 in FIG. 1. The client device 105 is annotated with an identifier of '123,' which may indicate a network address of the client device 105. Similarly, the client device 106 is annotated with an identifier of '456,' which may indicate a network address of the client device 106. The client device 107 is annotated with an identifier of '789,' which may indicate a network address of the client device 107. Table 1 below lists the link identifiers L1-L10 and a corresponding channel band.

TABLE 1

Link Reference Labels and Link identifiers with channel band
Link Identifier (channel band)

| |
|---|
| L1 (A) |
| L2 (A) |
| L3 (A) |
| L4 (B) |
| L5 (B) |
| L6 (B) |
| L7 (B) |
| L8 (A) |
| L9 (A) |
| L10 (B) |

FIG. 1 illustrates an example of steering traffic of the client device 106 from one path to a different path. The AP 101 maintains information to facilitate the traffic steering. In FIG. 1, the AP 101 maintains a table 102, which indicates information about each client device associated with the AP 101. The table 102 indicates a client device (e.g., by a network address of that client device), a path associated with the client device, the band of the path, and a data rate or throughput for the client device. Each paths in the table 102 includes two links, and the corresponding annotation used in the table 102 is <first link>.<second link>. For example, the entry for a path for the client device 106 (denoted with '456') is annotated as 'L1.L3', indicating that the path includes links L1 and L3. The bandwidth of each path is presented as Mb/s as an example but other bandwidth units may be used, such as kb/s.

The AP 101 may also maintain a table 104, which is used for storing information about candidate paths between the client device 106 and the AP 101. The first column of the table 104 indicates a signal strength of each of the candidate paths, indicated as a signal strength indicator (SSI). The SSI may indicate a received signal strength indicator (RSSI) of each of the candidate paths, a transmitted signal strength indicator (TSSI) of each of the candidate paths, or any suitable indication of signal strength. The AP 101 may indicate SSI in terms of measured power, such as by using Decibel-milliwatts (dBm) or milliwatts (mW). The SSI may also be estimated instead of measured. The AP 101 may determine the SSIs for each link of each of the candidate paths. For those links that have the AP 101 as an endpoint (referred to herein as "local links"), the AP 101 may estimate or measure the SSI. For those links that do not have the AP 101 as an endpoint (referred to herein as "remote links"), the AP 101 may collect the SSIs from the intermediate AP 111 and/or intermediate AP 113. For the SSIs, the annotation used in the table 104 is <SSI of first candidate path link>/<SSI of second candidate path link>.

The second column of the table 104 indicates one or more candidate path links for each of the candidate paths. The candidate path links that do not have the AP 101 as an endpoint include links L2, L3, L5, L9, L6, and L10. Regardless of the endpoint used, the example annotation used in the table 104 for each candidate path is <first candidate path link>.<second candidate path link>. The table 104 can indicate candidate path links for paths that use multiple intermediate APs. For example, for a path between the client device 107 and the AP 101, the example notation may be <first candidate path link>.<second candidate path link>.<third candidate path link>.

The third column of the table 104 indicates the band of each of the candidate paths. The example annotation used in the table 104 for each candidate path link of each candidate path is <band of first candidate path link>.<band of second candidate path link>. For example, the table 104 indicates a band 'B' for the candidate path link L4 of a first candidate path. The table 104 indicates band 'A' for a first candidate path link L8 of a third candidate path and band 'B' for a second candidate path link L5 of the third candidate path. If all links in a candidate path have the same band, only band 'A' or band 'B' is denoted.

The fourth column of the table 104 indicates the available bandwidth of each candidate path. The available bandwidth may be presented as Mb/s. However, other bandwidth units may be used for the available bandwidth, such as kb/s. The available bandwidth may be based on the amount of traffic on each of the candidate paths. The available bandwidth may be determined based on the SSI and a channel load for each of the candidate paths.

In some embodiments, the AP 101 performs operations for steering traffic in a plurality of stages. The following discussion will describe these operational stages.

At stage 1, the AP 101 selects the client device 106 for traffic steering. In the table 102, the table entry for the client device 106 (i.e., the entry having identifier '456') is depicted in bold to indicate selection of the client device 106 for traffic steering.

At stage 2, the AP 101 determines available bandwidth for each of the candidate paths, and selects a candidate path. In one embodiment, for communications based on the Institute of Electrical and Electronics Engineers (IEEE) 802.11k, the AP 101 may receive beacon reports from the intermediate AP 111 and/or intermediate AP 113. A beacon report may indicate received signal strength measurements of links. Client devices and/or intermediate APs may also be able to receive the beacon reports. The AP 101 may collect the received signal strength measurements for downlinks indicated in the beacon reports, and determine the SSIs for these downlinks. In one embodiment, the AP 101 can request that the intermediate AP 111 and/or intermediate AP 113 determines signal strength measurement of links. In one embodiment, the AP 101 can request that the client device 105 and/or client device 106 determines signal strength measurement of links. The client devices 105 and 106 may generate the beacon reports, and the intermediate AP 111 and/or intermediate AP 113 can relay the client device-generated beacon reports to the AP 101.

Using information in the table 104, the AP 101 may determine that a new path has a greater available bandwidth than the currently used path for the client device 106. For example, the AP 101 may determine that the path currently used by the client device 106 includes link L1 and link L3. The AP 101 may determine that the fifth candidate path of the table 104 (i.e., the candidate path including candidate path link L8 and candidate path link L9) has a greater available bandwidth than the currently used path. The AP 101 may then select the fifth candidate path of the table 104 based on this determination. When multiple intermediate APs are used between the AP 101 and the client device, such as between the AP 101 and the client device 107, the AP 101 may select a candidate path through the multiple intermediate APs (i.e., the intermediate AP 111 and the intermediate AP 115).

At stage 3, the AP 101 steers traffic of the client device 106 to the selected path. The AP 101 may cause the client device 106 to disconnect from the currently used path (i.e., disconnect from the link L3). Once the client device 106 disconnects from the link L3, the intermediate AP 113 no longer uses link L1 for forwarding traffic between the AP 101 and the client device 106. Thus, the AP 101 steers traffic of the client device 106 to the selected path by causing the client device 106 to establish communication using the non-established candidate path link L9 in band A. If the AP 101 selects a different path that uses an established link between the client device and the intermediate AP 111, the AP 101 may steer traffic of the client device 106 by causing the client device 106 to switch to the established link. In one embodiment, the AP 101 may steer traffic to the client device 106 by causing the intermediate AP 111 to cause the client device 106 to establish communication using the non-established candidate path link L9 or to use an already established link.

Once the client device 106 establishes communication using the link L9 (or switches to an already established candidate path link), the intermediate AP 111 or the AP 101 may select one of the links L7 or L8. For downlink traffic (i.e., communication from the AP 101), the AP 101 may choose either L7 or L8 based on the bandwidth and/or the SSI of each link. The AP 101 may choose link L8 as described above with respect to stage 2. For uplink traffic (i.e., communication to the AP 101 from the intermediate AP 111), the intermediate AP 111 may choose either L7 or L8 based on the bandwidth and/or the SSI of each link.

When multiple intermediate APs are used between the AP 101 and the client device, such as between the AP 101 and the client device 107, the AP 101 may select a candidate path through multiple intermediate APs (i.e., the intermediate AP 111 and the intermediate AP 115). In this case, the AP 101 may steer traffic of client device 107 by causing the client device 107 to use a candidate path link (not shown) between the client device 107 and the intermediate AP 115. The intermediate APs 115 and 111, and the AP 101 may select what link(s) to use for forwarding traffic of the client device 107 (i.e., similarly to the manner described above with regard to the selection of links L7 and L8 for the path between the AP 101 and the client device 106).

Figure 2:
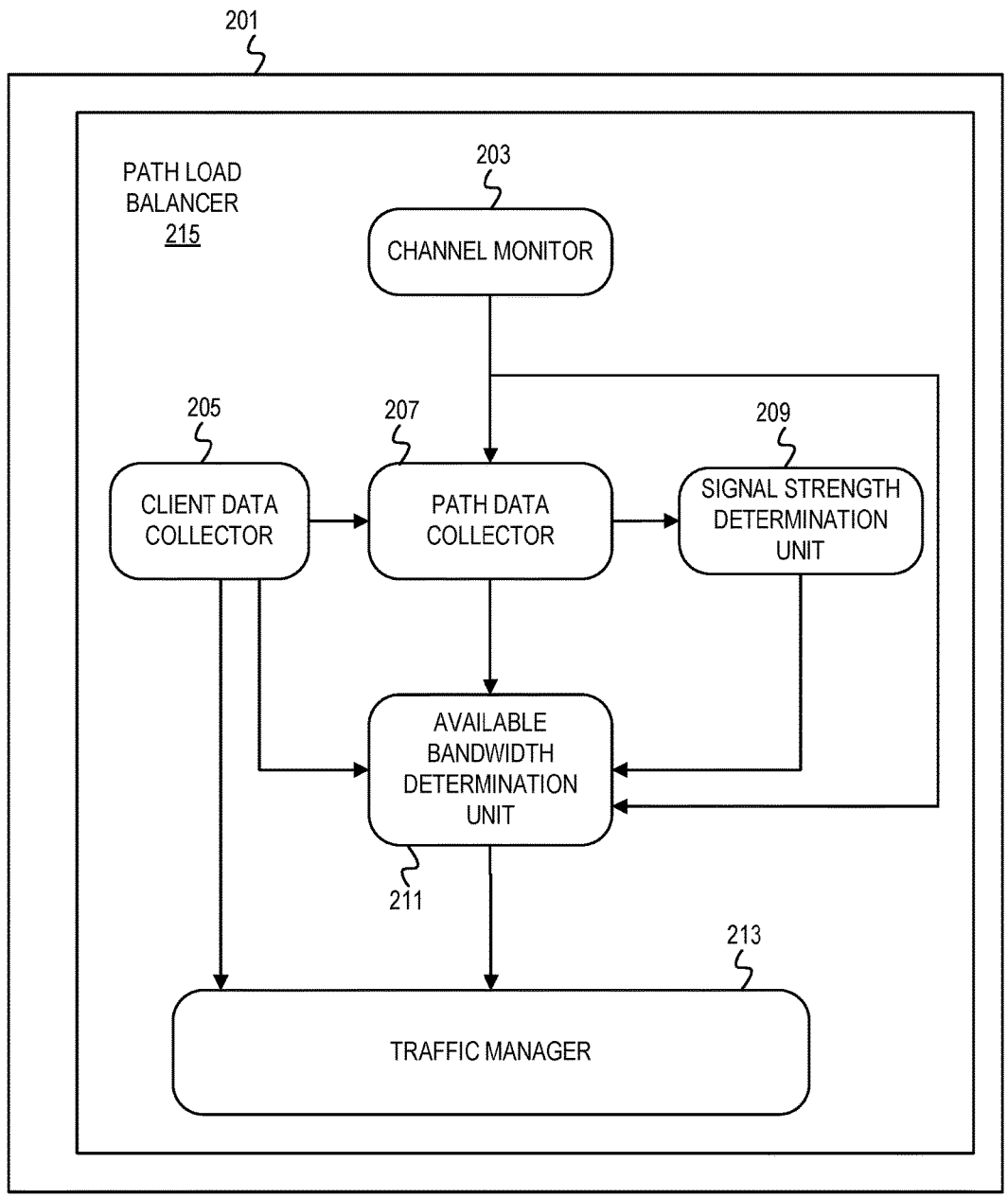
FIG. 2 depicts a block diagram of an example AP with load balancing capability, according to some embodiments.

FIG. 2 depicts a block diagram of an AP 201 with load balancing capability. Not all components of the AP 201 are depicted (e.g., antennas, signal detectors, modulators, automatic gain control circuitry, receive chains, etc.). The depicted blocks align with particular functions and not specific hardware. The names for the blocks of the AP 201 are not intended to indicate any particular components, but to organize functionality for explanatory purposes. Some functionality may be performed by multiple components (e.g., both by a receiver and a transmitter).

FIG. 2 depicts a path load balancer 215 that includes a channel monitor 203, a client data collector 205, a signal strength determination unit 209, a path data collector 207, an available bandwidth determination unit 211, and a traffic manager 213.

The channel monitor 203 monitors active channels of the AP 201. An active channel is a channel that is used for communication by the AP 201 with other devices on the wireless network. The channel monitor 203 may be embodied in a receiver, a transmitter, or both. The channel monitor 203 may monitor the active channels to determine operational information about the active channels. Operational information may include bandwidth consumed, channel availability, and number of links on a channel (i.e., number of associated client devices using a channel). The channel monitor 203 may use the operational information to determine when a channel is overloaded. When the channel monitor 203 detects an overloaded channel, the channel monitor 203 may notify the path data collector 207. The channel monitor 203 may also indicate channel availability to the available bandwidth determination unit 211.

The client data collector 205 may collect and maintain client data about the client devices associated with the AP 201. The client data collector 205 may record client data from messages received from the client devices when establishing links, such as via beacon reports, connection messages, etc. This client data may include communication capability (e.g., band capability, communication protocol, etc.), priority information, quality of service information, etc. The client data collector 205 may also determine information about associated client devices based on the messages themselves. For example, the client data collector 205 may determine the type of traffic (e.g., user datagram protocol (UDP) traffic, transmission control protocol (TCP) traffic, etc.). The client data collector 205 may communicate at least some client data about the client devices to the path data collector 207, the available bandwidth determination unit 211, and/or the traffic manager 213. The client data collector 205 may provide band capability information to the path data collector 207 and/or the available bandwidth determination unit 211. The client data collector 205 may differentiate the client devices into different classes, such as based on the priority information of the client devices. The client data collector 205 may indicate the different classes of client devices to the traffic manager 213.

The path data collector 207 determines candidate paths from the AP 201 to a client device. The channel monitor 203 may indicate a trigger to the path data collector 207 and/or to the available bandwidth determination unit 211. The trigger may cause the path data collector 207 to determine the candidate paths to a client device. The trigger may be caused by a detection of an idle client device, a detection of an overloaded channel, a detection of an overloaded path, etc.

The path data collector 207 may use topographical data collected by the AP 201 to determine the candidate paths. The AP 201 may collect topographical data related to AP 201 by detecting existence and location of any intermediate APs and client devices. Further, the intermediate APs may report existence and location of other intermediate APs and client devices that the AP 201 may not be able to detect. The path data collector 207 may also use communication capability from the client data to ascertain the candidate paths to a client device. The path data collector 207 may indicate the candidate paths to the signal strength determination unit 209 and the available bandwidth determination unit 211.

The signal strength determination unit 209 determines signal strength values or indicators for each link of the candidate paths. Links on a candidate path are referred to as candidate path links. For some candidate path links, the signal strength determination unit 209 may measure the power of received signals from the other endpoint of the link. For instance, automatic gain control circuitry may be used to measure received signal strength. For an established candidate path link, the received signal strength for the candidate path link may have already been measured.

For candidate path links that are not established, the signal strength determination unit 209 may estimate signal strength. As an example, the channel for the candidate path link that is not established may be in a different band than another link that is established between the AP 201 and the other endpoint device. In this case, the signal strength determination unit 209 may estimate received signal strength for the non-established candidate path link based on correlation between the bands. For remote candidate path links (i.e., those candidate path links remote from the AP 201), the signal strength determination unit 209 requests SSIs from the intermediate APs. The signal strength determination unit 209 indicates the signal strength values to the available bandwidth determination unit 211.

The available bandwidth determination unit 211 determines available bandwidth for each candidate path, also referred to herein as a determined available bandwidth. In one embodiment, the available bandwidth determination unit 211 may determine the available bandwidth upon receiving a trigger from the channel monitor 203. In another embodiment, the available bandwidth determination unit 211 may determine the available bandwidth upon receiving data from the path data collector 207, the client data collector 205, and the signal strength determination unit 209.

The available bandwidth determination unit 211 may determine available bandwidth for a candidate path based on the peak data rates for each of the candidate path links and availability of the corresponding channels. For example, with reference to the table 104 of FIG. 1, the available bandwidth determination unit 211 computes that the available bandwidth for the fifth candidate path (with candidate path links L8 and L9) is 80 Mb/s. Availability of the channels (also referred to as "channel availability" of each of the channels) may be determined based on a percentage of time a transmitter waits to transmit or waits to retry a transmission on the channel over a certain interval of time. The peak data rate for a candidate path link may be computed based on a determined SSI of the candidate path link. The available bandwidth ($BW_{p,\ c}$) for all candidate path links on a channel c of a candidate path p may be computed in accordance with the following:

$$BW_{p,\ c} = m * \left(\prod_{l=1}^{n} r_l\right) / \sum_{l=1}^{n} r_l,$$

wherein m is the availability of a channel c; n is a number of candidate path links, and $r_l$ is a peak data rate for the candidate path link l.

Different channels may have different availability. Thus, each channel may have a range of availability values, from a minimum bandwidth to a maximum bandwidth. The available bandwidth determination unit 211 may compute available bandwidth for a candidate path conservatively when a candidate path traverses different channels. For instance, the available bandwidth determination unit 211 may compute available bandwidth for a candidate path based on a minimum bandwidth available per channel. The available bandwidth determination unit 211 may compute available bandwidth in accordance with the above equation, per channel.

The available bandwidth determination unit 211 may select a minimum of the per channel computed available bandwidths. Referring to the table 104 of FIG. 1, the available bandwidth for the fourth candidate path (including candidate path links of L7 and L9) may be computed as the minimum of ((L7 channel availability*L7 peak data rate) and (L9 channel availability*L9 peak data rate)). After determining the available bandwidths for the candidate paths, the available bandwidth determination unit 211 provides the information on the available bandwidths for the candidate paths to the traffic manager 213.

The traffic manager 213 steers traffic of the client device based on the information from the available bandwidth determination unit 211. The traffic manager 213 may select the candidate path based on the information on the available bandwidths. The traffic manager 213 may compare a variance threshold to a variance of the available bandwidth for the candidate paths. If a difference in the available bandwidths among the candidate paths is outside the variance threshold, the traffic manager may select the candidate path with the highest available band. If the difference is within the variance threshold, the traffic manager 213 may deterministically (e.g., round robin) or non-deterministically (e.g., pseudo-randomly) select among the candidate paths.

The traffic manager 213 may use various techniques to steer the traffic of the client device. As described above with regard to stage 3 of FIG. 1, the traffic manager 213 may cause a client device to disconnect from a link of a currently used path. The traffic manager 213 may steer traffic of the client device to the selected path by causing the client device 106 to establish communication using a non-established candidate path link of the selected path. The traffic manager 213 may prevent a client device from associating with channels and/or APs other than channels and/or APs of the selected candidate path. For example, the traffic manager 213 may employ blacklists to prevent the client device from associating with the blacklisted channels and/or APs. If the client device has certain capabilities, then the traffic manager 213 may employ mechanisms corresponding to the capabilities (e.g., basic service set (BSS) transition management feature in the IEEE 802.11v amendment). The traffic manager 213 may select a candidate path for steering of the client traffic. The traffic manager 213 may also select an alternate path for steering of the client traffic. In some embodiments, the traffic manager 213 may use both a transition management feature and blacklist steering when steering traffic of a client device.

The traffic manager 213 may implement the transition management feature using a transition request that is sent by the AP to the client device. The transition request may request the client device to steer its traffic away from a certain path. The transition request may also request the client device to steer its traffic to use a candidate path or an alternate path. The transition management feature may be implemented by the traffic manager 213 that is IEEE 802.11v compliant.

The traffic manager 213 may send a transition request to the client device. If the client device complies with the transition request, the traffic manager 213 may not use the blacklist steering for the client device. For example, the traffic manager 213 may determine that that the client device is steering its traffic away from a certain path and/or channel, as requested by the transition request. The traffic manager 213 may also determine that the client device is steering its traffic to a certain path and/or channel, as requested by the transition request.

If the client device does not comply with the transition request, the traffic manager 213 may use the blacklist steering for the client device. Thus, the traffic manager may first attempt to steer the traffic of the client device by transmitting the transition request and then by using the blacklist steering. The traffic manager 213 may use blacklist steering by placing certain channels, and/or network devices on a blacklist. Once a channel, and/or network devices is placed on a blacklist, then the traffic manager 213 will not associate the client device with that channel, and/or network device.

In one embodiment, the traffic manager 213 may keep track of which client devices comply with the transition request. When steering traffic of a client device, the traffic manager 213 may determine whether traffic of a certain client device should be steered using blacklist steering only, using transition requests only, or both.

The traffic manager 213 may limit traffic of the client device on its current path. In the case of an overloaded channel, the traffic manager 213 may use the client data from the client data collector 205 to prioritize client devices associated with the overloaded channel. The traffic manager 213 may begin steering traffic of those client devices that may be interrupted (e.g., that are tolerant of interruptions) to candidate paths on a different channel to relieve the overloaded channel.

Although FIG. 2 presumes that the AP 201 is a root AP, at least some of the described functionality is not limited to root APs. For example, the signal strength determination unit 209, client data collector 205, channel monitor 203, and/or available bandwidth determination unit 211 may be embodied in intermediate APs. In one embodiment, an intermediate AP may determine one or more candidate paths from itself to the client device, and communicate these candidate paths to the root AP.

Figure 3:
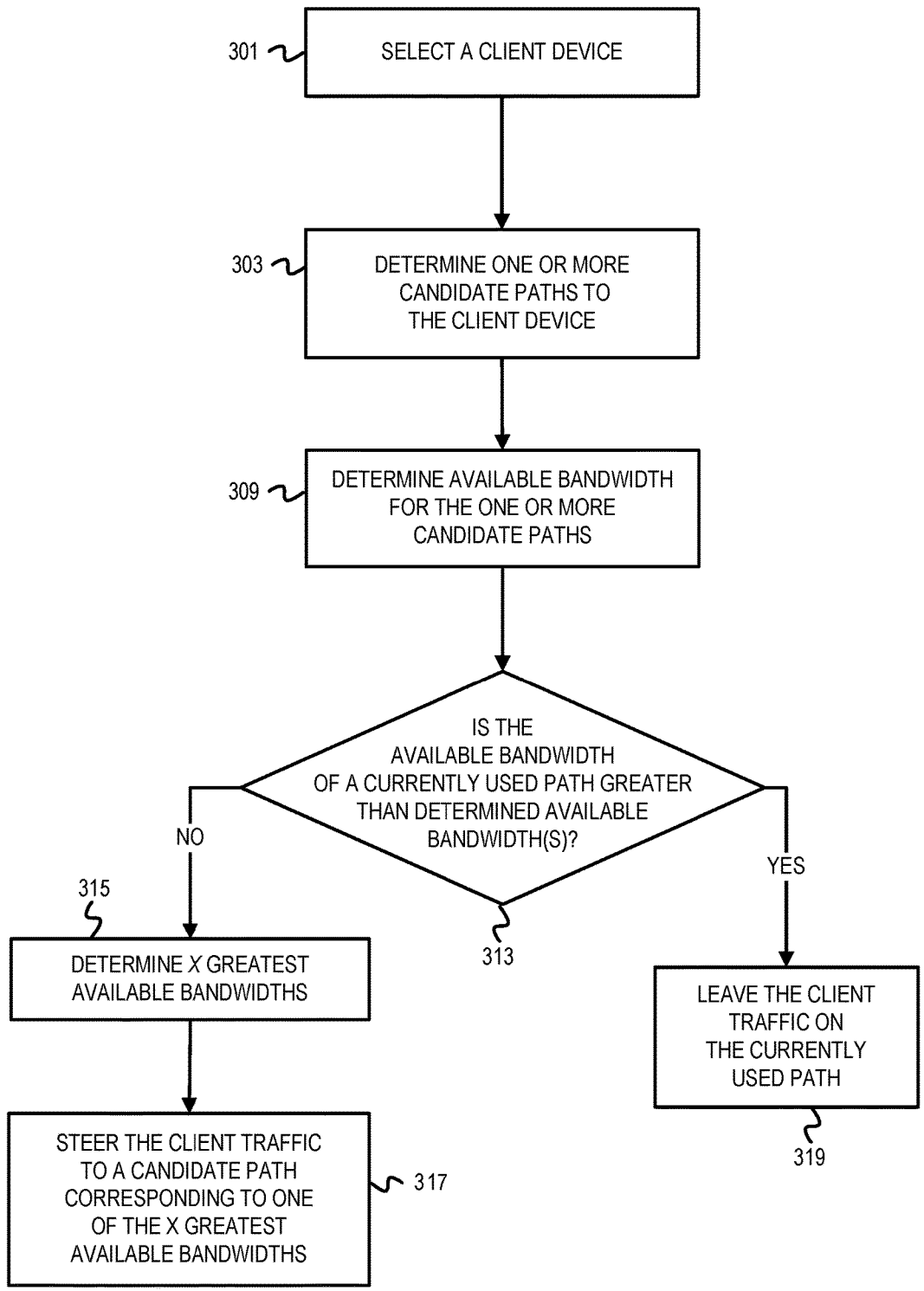
FIG. 3 depicts a flowchart of example operations for load balancing traffic of the client device across paths, according to some embodiments.

FIG. 3 depicts a flowchart of example operations for load balancing traffic of the client device across paths. Traffic of the client device (also referred to herein as "client traffic") includes communications between the client device and a root AP. The example operations are described with reference to an AP, such as the AP 101 of FIG. 1 and/or the AP 201 of FIG. 2.

At block 301, an AP selects a client device. In one embodiment, the AP (e.g., AP 101 of FIG. 1) performing the selection may be the same device as the root AP (i.e., AP 101 of FIG. 1). In another embodiment, the AP (e.g., intermediate AP 113 of FIG. 1) performing the selection may be another device from the root AP (i.e., AP 101 of FIG. 1). The AP may monitor paths to identify any idle client devices. The AP may then select an idle client device for traffic steering. The idle client device may be chosen to reduce the likelihood of disrupting traffic of that client device. For example, the AP 101 may select the client device 106 of FIG. 1.

At block 303, the AP determines candidate paths to the client device. The AP may determine the candidate paths with topographical data already obtained by the AP. The topographical data may indicate the location and connectivity of candidate paths and devices on the wireless network. The AP may query one or more intermediate APs to create or update the topographical data. The AP may receive beacons reports for associated client devices from the intermediate APs with the topographical data. The AP may also use information about the client devices and intermediate APs to determine the candidate paths. For instance, some links cannot be used as candidate path links in a candidate path due to limited capability of the client device.

At block 309, the AP determines the available bandwidth(s) for one or more candidate paths. The AP may not necessarily determine available bandwidth for all of the candidate paths determined at block 303. For example, the AP may be configured with a floor and/or ceiling number of candidate paths to consider. In addition, the AP may also be configured to stop determining available bandwidths for candidate paths once a stopping criterion is met. A stopping criterion may be defined as a first candidate path with an available bandwidth greater than the currently used path. A stopping criterion may be defined as a first candidate path with an available bandwidth that is at least a certain percentage greater than the available bandwidth of the currently used path.

At block 313, the AP determines whether the available bandwidth of the currently used path is greater than the determined available bandwidth(s) of the candidate paths.

With reference to FIG. 1, the AP 101 may determine whether the available bandwidth of 20 Mb/s of the currently used path of L1.L3 of the client device 106 is greater than the determined available bandwidth of each of the candidate paths of the table 104. If the available bandwidth of the currently used path is greater, then control flows to block 319. Otherwise, control flows to block 315 for traffic steering.

At block 319, the AP leaves the client traffic on the currently used path. In one embodiment, the AP may then perform block 301 to select another client device.

At block 315, the AP determines x of the greatest available bandwidths, where x may be any number greater than 0. For instance, the AP may select the greatest of the determined available bandwidths (i.e., x=1). In the alternative, the AP may select the two greatest (i.e., x=2) of the determined available bandwidths. The value for x may be a static value or a dynamic value that may vary based on the variation among the determined available bandwidths. As an example of a dynamic x, the AP may select all of the determined available bandwidths that are within a threshold of variation of each other. By selecting multiple candidate paths other than the candidate path associated with the greatest determined available bandwidth, client traffic may be spread among various candidate paths. The selection of multiple candidate paths also prevents a possible overload of the candidate path associated with the greatest determined available bandwidth.

At block 317, the AP steers the client traffic to a candidate path corresponding to the selected one of the x greatest determined available bandwidths. The traffic manager 213 may use a transition management feature and/or blacklist steering when steering traffic of a client device. Block 317 may be performed multiple times for each of the x greatest determined available bandwidths if x>1. The AP may steer the client traffic using various techniques. Steering the client traffic may involve the AP disassociating with the client device to cause the client device to seek association with a different AP or channel. After disassociating with the client device, the AP may also use techniques for preventing the client device from associating with candidate paths except for the selected candidate path. The AP may notify intermediate APs that are not on the selected candidate path to block the client device from associating.

The AP may steer the client traffic using a defined mechanism, such as BSS transition request, depending upon capability of the client device. APs (e.g., root and/or intermediate) may provide information to the client device to help the client device with choosing a path. In one embodiment, the AP may provide information to the client device regarding a portion of the path (i.e., between the client device and the intermediate AP). The AP may also provide information to the intermediate AP regarding another portion of the path. For example, the AP may communicate the available bandwidth of backhaul links to the client device. The backhaul links are links that are between the root AP and the intermediate AP. With reference to FIG. 1, the backhaul links for the client device 106 are the link L1 for the intermediate AP 113, and the links L7 and L8 for the intermediate AP 111. As an example, the AP may communicate this information to the client device with a message that conforms to an implementation of the IEEE 802.11u amendment.

When providing the available bandwidth information to the client device, the intermediate APs may determine whether to use different bands on the backhaul links than the band the client device chooses for access links. The access links are links that are between the client and the intermediate APs. With reference to FIG. 1, the access links for the client device 106 are the link L3 for the intermediate AP 113, and the links L5 and L9 for the intermediate AP 111. For example, an intermediate AP may indicate the available bandwidth served to the client device on the A band (e.g., a 2.4 GHz band) if the client device were to associate with the A band.

The intermediate AP may have two backhaul links to the root AP, each with a different available bandwidth. For example, a first backhaul link may have an available bandwidth of 50 Mb/s on band A and a second backhaul link may have an available bandwidth of 120 Mb/s on band B (e.g., a 5 GHz band). The intermediate AP may indicate, to the client device, the available bandwidths for each of the backhaul links. In one embodiment, the intermediate AP only indicates a non-shared portion of the available bandwidth if the backhaul link and the access link share another portion of the available bandwidth for that backhaul link. In other words, an intermediate AP may account for the bandwidth that will be used by the addition of the access link in the same band when reporting available bandwidth.

Figure 4:
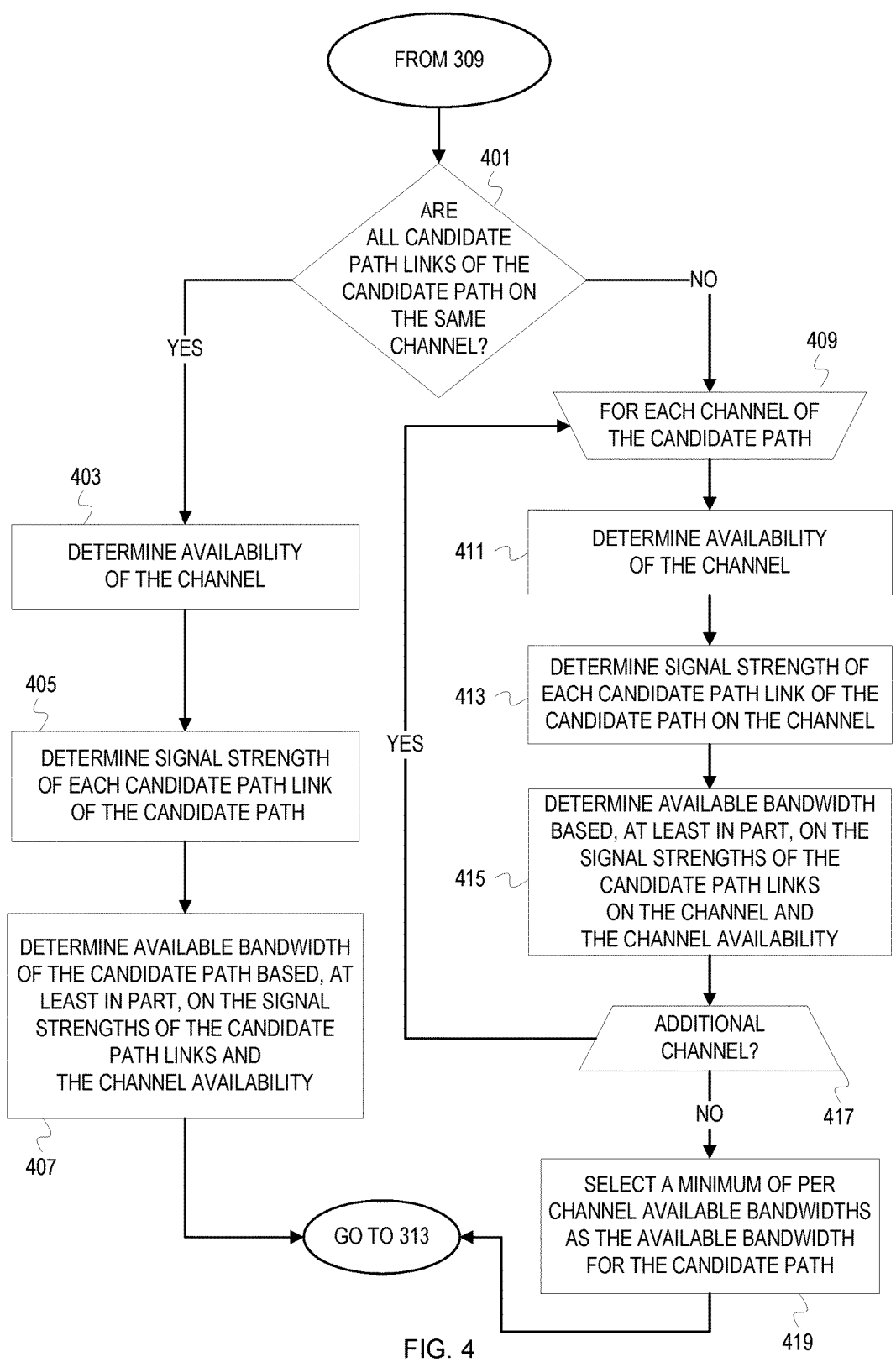
FIG. 4 is a flowchart of example operations for determining available bandwidth of a candidate path, according to some embodiments.

FIG. 4 is a flowchart of example operations for determining available bandwidth for a candidate path. Although FIG. 4 is depicted as an implementation of block 309 in FIG. 3, the operations of FIG. 4 are not constrained to the flowchart as presented in FIG. 3.

At block 401, an AP determines whether all candidate path links of a candidate path are on the same channel. The AP may access capability information for candidate path links of the candidate path. The capability information may indicate the protocol and/or channel associated with established links. For non-established links, the AP may determine the protocol and/or the channel of the non-established link based, for example, on information received from an intermediate AP. With this information, the AP determines whether all of the candidate path links are on a same channel. If all candidate path links are on the same channel, then control flows to block 403. If all candidate path links are not on the same channel, then control flows to block 409.

At block 403, the AP determines availability of a channel. This information may be maintained by the AP for all active channels. The AP may determine channel availability based on historical data within a given interval of time at a time offset from a current time. The AP may determine channel availability based on historical data for a time interval that begins proximate to an initiation of candidate path evaluation (e.g., performance of block 401).

At block 405, the AP determines signal strength (i.e., SSI) of each candidate path link of the candidate path. For some candidate path links, the AP may measure the received signal strength. For other candidate path links, the AP may estimate the received signal strength.

At block 407, the AP determines an available bandwidth for the candidate path based, at least in part, on the signal strengths of the candidate path links and on the availability of the channel. The AP may also determine the available bandwidth based on a PHY rate information and/or packet error rates associated with the candidate path.

If at block 401 the AP determines that the candidate path links are not on the same channel, then the AP distinguishes between the candidate path links per channel. The candidate path links are thus on multiple channels. At block 409, the AP begins operations to determine an available bandwidth per channel of the candidate path. Thus, at block 409, the AP may initially begin blocks 411-415 using a first of multiple channels. Upon each iteration of block 409, the AP may begin blocks 411-415 using a next of the multiple channels.

At block 411, the AP determines availability of the channel. Block 411 may be performed similarly to block 403 for the channel.

At block 413, the AP determines signal strength of each candidate path link of the candidate path on the channel. Block 413 may be performed similarly to block 405 for the channel.

At block 415, the AP determines an available bandwidth for the candidate path based, at least in part, on the signal strengths of the candidate path links on the channel and the availability of the channel. The AP may also determine the available bandwidth based on a PHY rate information and/or packet error rates associated with the candidate path. Block 415 may be performed similarly to block 407 for the channel.

At block 417, the AP determines whether there is an additional channel of the multiple channels for the candidate path. If there is an additional channel, then control returns to block 409. If there are no more additional channels to evaluate, then control flows to block 419.

At block 419, the AP selects a minimum bandwidth of the per channel available bandwidths. The AP may select this minimum bandwidth as the bandwidth for the candidate path.

The operations of FIG. 4 logically flow back into block 313 of FIG. 3.

Figure 5:
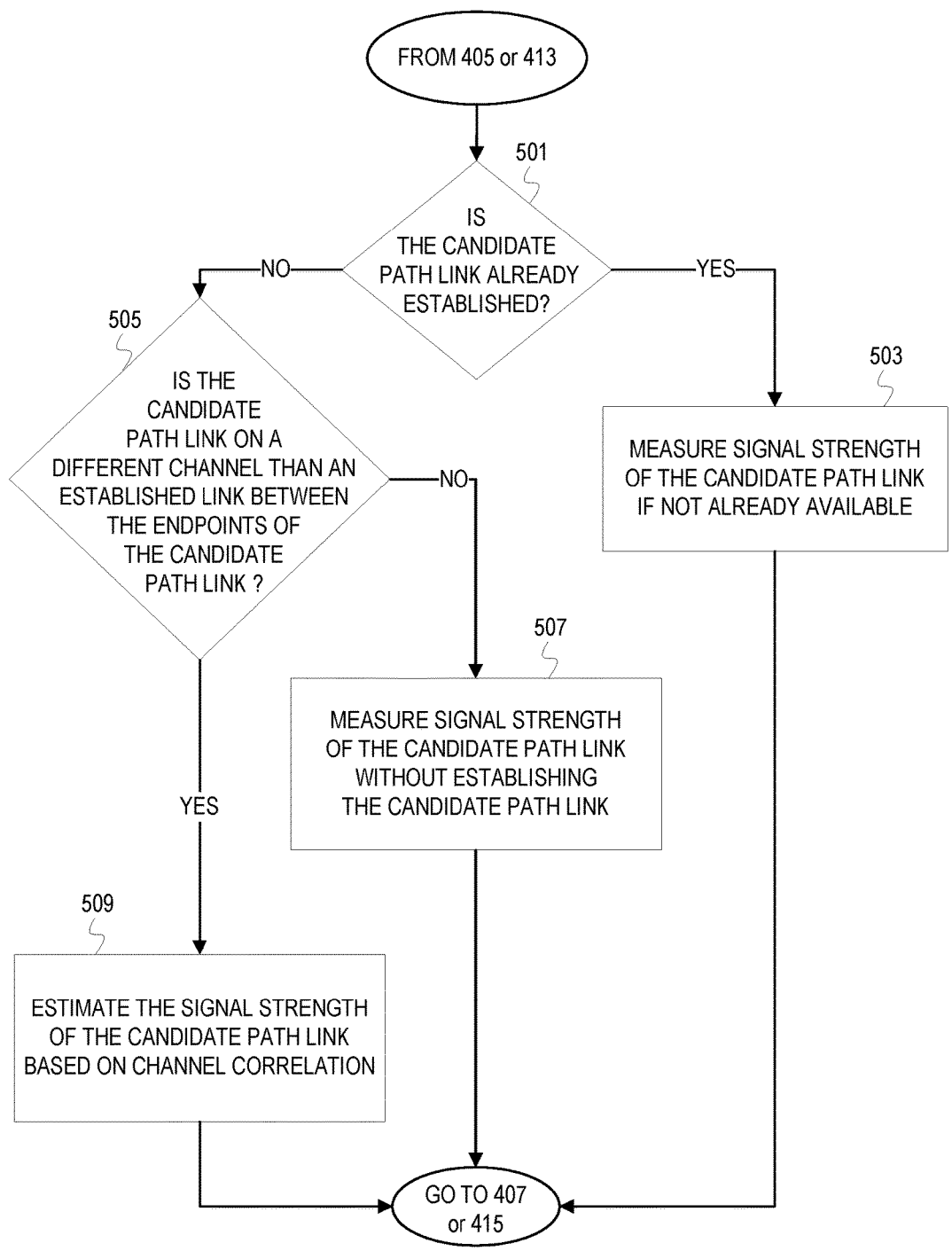
FIG. 5 depicts a flowchart of example operations determining signal strength of a candidate path link, according to some embodiments.

This description continues with a discussion of operations for determining signal strength of a candidate path link. FIG. 5 depicts a flowchart of example operations for determining signal strength (SSI) of a candidate path link. Although FIG. 5 is depicted as an implementation of block 405 or block 413 of FIG. 4, it is not necessary for the operations of FIG. 5 to be constrained to the flowchart presented in FIG. 4.

At block 501, an AP determines whether a candidate path link is already established. Some of the candidate path links in the candidate path may already be established. If the link is already established, then control flows to block 503. Otherwise, control flows to block 505.

At block 503, the AP measures the received signal strength of the candidate path link if the received signal strength is not already available. The received signal strength for a candidate path link may already be stored at the AP. The AP may obtain an updated measurement of the received signal strength depending on the age of the previous measurement.

At block 505, the AP determines whether the candidate path link is on a different channel than an established link between the link endpoints. If there is an established link on a different channel between the endpoints of the candidate path link, then control flows to block 509. If there is no established link on a different channel between the endpoints of the candidate path link, then control flows to block 507.

At block 507, the AP measures received signal strength of the candidate path link without establishing the candidate path link. The AP may employ various techniques to measure received signal strength for non-established links. For instance, a client device may be with a different AP. If another link with the different AP has the same or similar characteristics as the candidate path link (e.g., has the same channel), then the AP may send spoofed packets to the endpoint device of the other link. The spoofed packets are sent to elicit response packets and to measure received signal strength of the response packets. The AP may also use predefined messages that do not leverage established links. For instance, the AP may transmit a request to send (RTS) message to the endpoint device of the other link and measure received signal strength of the corresponding clear to send (CTS) message. The AP may also employ packet sniffing of communication from the endpoint device of the other link. The AP may measure received signal strength of any sniffed packets. As another example technique, an AP may measure probe requests from the client device.

At block 509, the AP leverages correlation information for the channel of the established link and the channel of the candidate path link. The AP may estimate the signal strength of the candidate path link based on channel correlation between two channels. For example, the AP may use a correlation between a channel in the A band and a channel in the B band. The AP may have access to locally stored or remotely stored channel correlation data. The data may be generated from experiments and/or from historical observations by the AP. For example, the AP may collect data when different channels are established. Afterwards, the AP may compute a correlation factor or a translation factor based on the collected data. As another example, correlation factors for different pairs of channels may be accessible to the AP. The AP may modify the correlation factors based on historical and/or operational data for the channels.

An AP may select client devices for possible steering of the client traffic to load balance across paths based on other criteria besides idle time. Examples of these criteria include bandwidth availability across a wireless network, a number of reconnections, total transfers, etc. In addition, load balancing may be triggered when channel becomes overloaded. FIGS. 6-9 depict flowcharts of example operations for steering of the client traffic to load balance client traffic when a path is overloaded.

Figure 6:
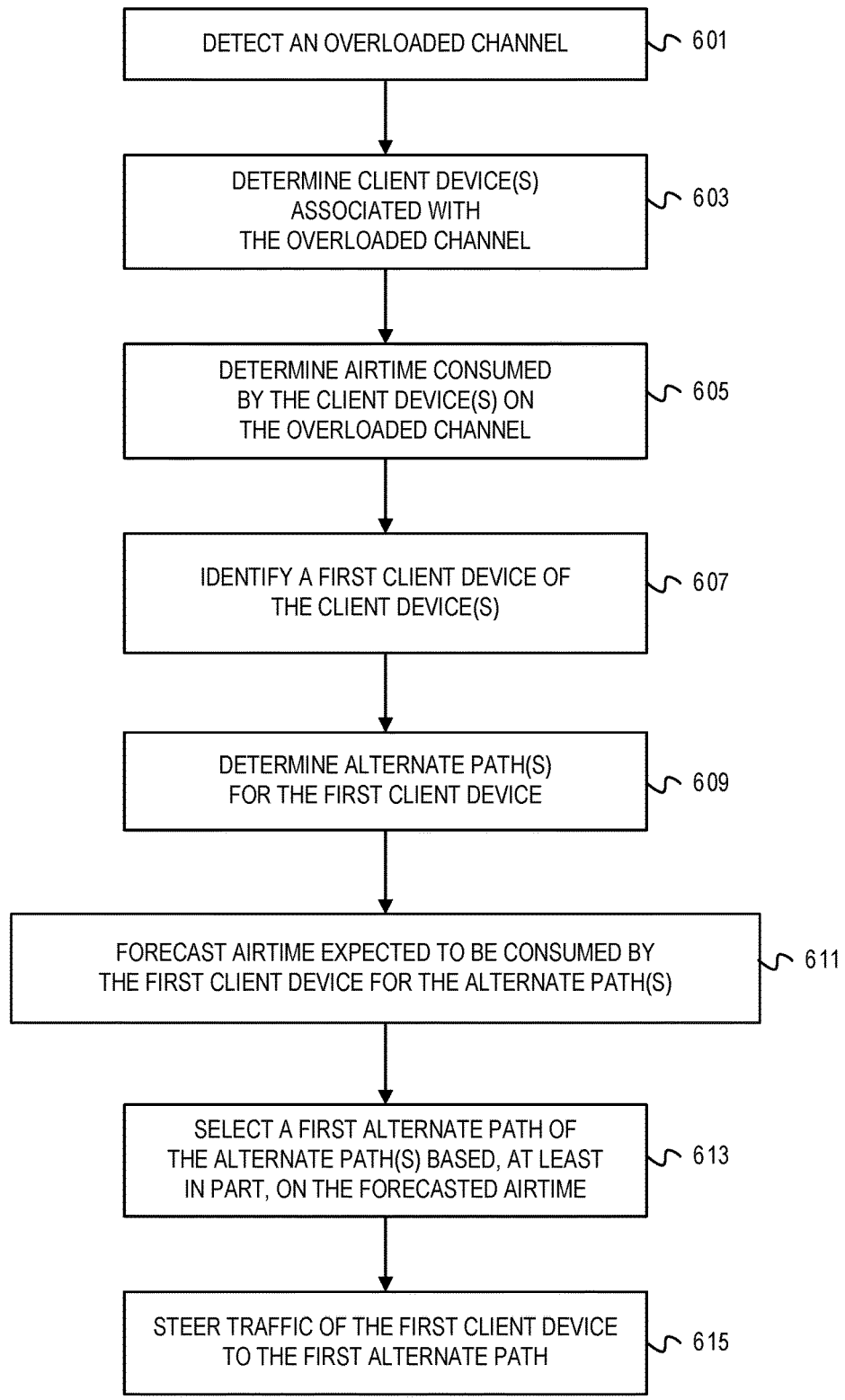
FIG. 6 depicts a part of a flowchart of example operations for identifying and organizing client devices associated with an overloaded channel, according to some embodiments.

FIG. 6 depicts a flowchart of example operations for identifying and organizing the client devices associated with an overloaded channel.

At block 601, an AP detects an overloaded channel. The overloaded channel may be any channel that is used in communicating between the devices of FIG. 1. In one embodiment, the AP may prevent new associations with the overloaded channel.

Figure 7:
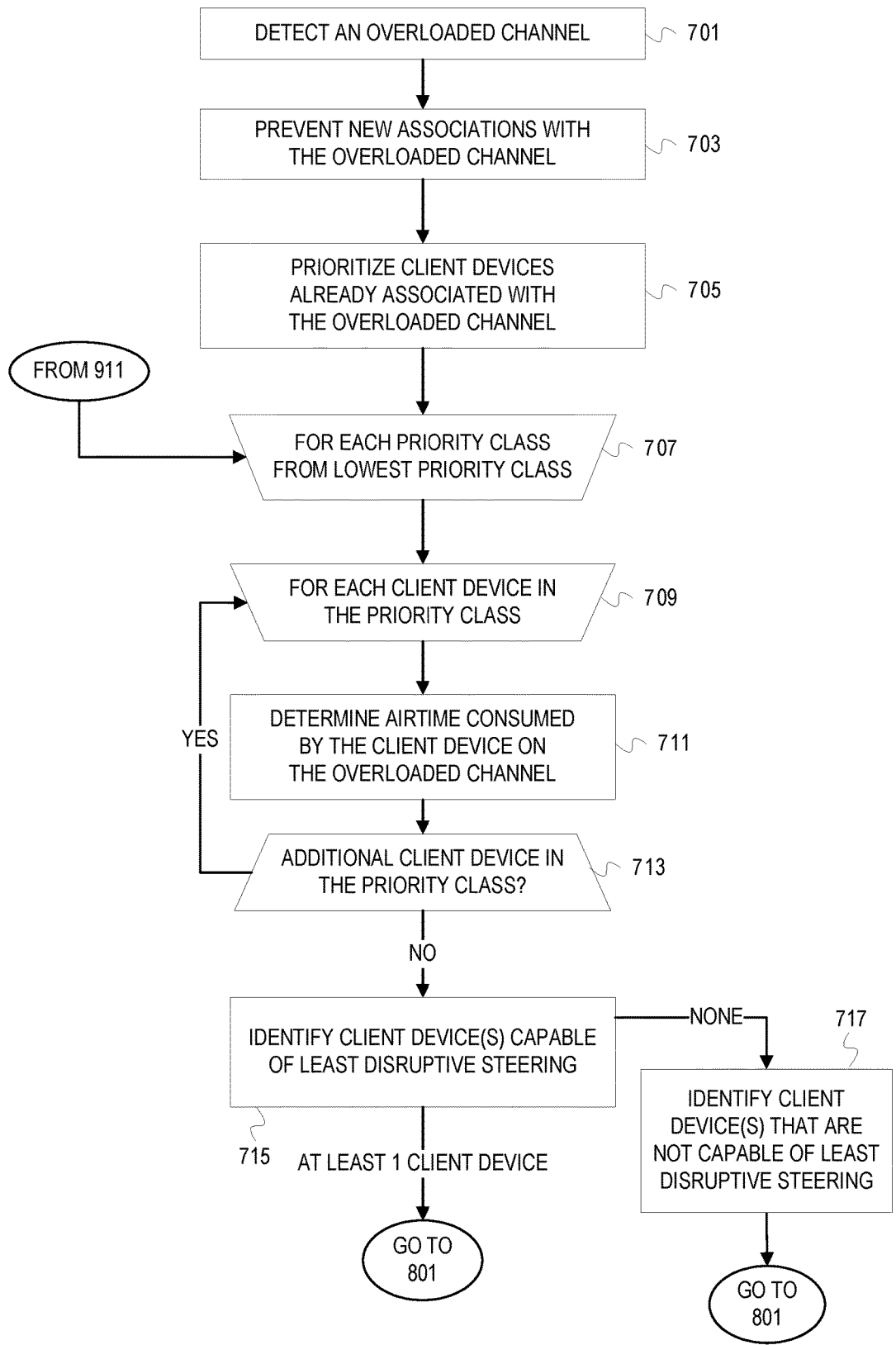
FIG. 7 depicts a part of a flowchart of example operations for identifying and organizing the client devices associated with the overloaded channel, according to some embodiments.

At block 603, the AP determines one or more client devices associated with the overloaded channel. Block 705 of FIG. 7 illustrates one embodiment of prioritizing the client device(s) associated with the overloaded channel. FIG. 7 will be discussed in more detail below. In another embodiment, the client device(s) associated with the overloaded channel have the same priority.

At block 605, the AP determines airtime consumed by the client device(s) on the overloaded channel. The airtime used by each of the client device(s) on the overloaded channel may be maintained by each AP in a path across the overloaded channel. The determined airtime may be computed as a sum of the airtime maintained at each AP in the path. If the path for the client device traverses different channels, the consumed airtime may not include the airtime consumed on the channels other than the overloaded channel. Blocks 707-713 of FIG. 7 (discussed below) illustrate one embodiment of determining the airtime consumed by the client device(s) on the overloaded channel. In another embodiment, the consumed airtime is determined for client device(s) associated with the overloaded channel in a single priority.

At block 607, the AP identifies a first client device of the client device(s). In one embodiment, the first client device may be identified based on the airtime consumed on the overloaded channel, such as a client device having a largest amount of airtime consumed. Block 715 (discussed below) illustrates another embodiment of determining the first client device.

At block 609, the AP determines one or more alternate paths for the first client device. Similar to determining candidate paths, the AP may determine the alternate path(s) based on topographical data and communication capability of the first client device. The alternate paths may not have non-established links.

At block 611, the AP forecasts the airtime to be consumed by the first client device for the alternate path(s). The AP may forecast the airtime based, at least in part, on channels used by the alternate path(s) and/or an average bandwidth of the client device over a certain window of time. Block 805 (discussed below) illustrates another embodiment of forecasting the airtime to be consumed by the first client device.

At block 613, the AP selects a first alternate path of the alternate path(s) based, at least in part, on the forecasted airtime. The AP may select the first alternate path based on the forecasted airtime and the consumed airtime for the first client device. For example, the AP may select the first alternate path based on an alternate path that has a greatest difference between a forecasted airtime and the consumed airtime for the first client device. Blocks 801 and 807 (discussed below) illustrate another embodiment of selecting the first alternate path.

At block 615, the AP steers the first client to the first alternate path. The AP may steer the first client to the first alternate path in the manner described with reference to the traffic manager 213 of FIG. 2.

Figure 8:
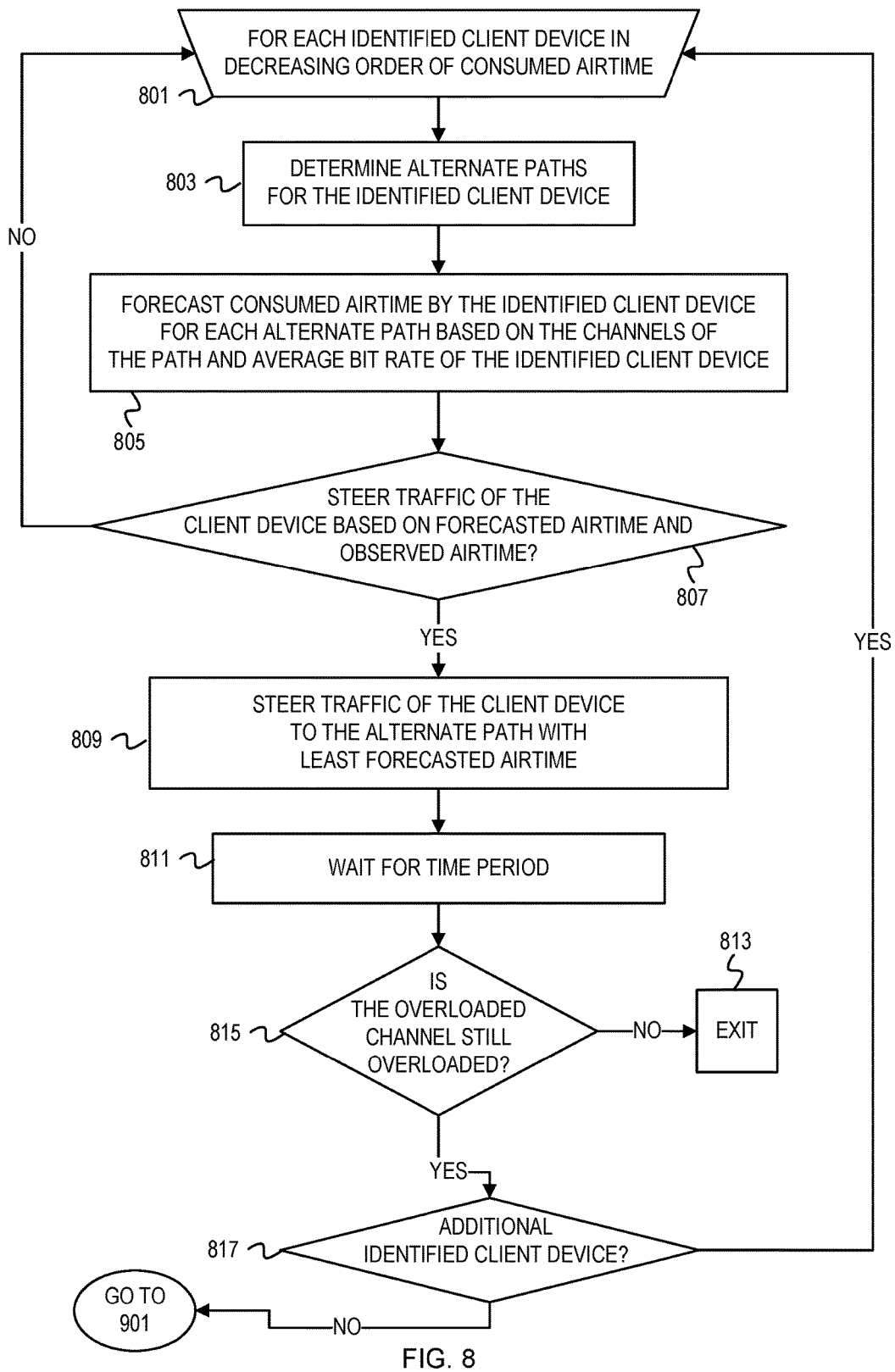
FIG. 8 depicts a flowchart of example operations for steering traffic to load balance across paths, according to some embodiments.
Figure 9:
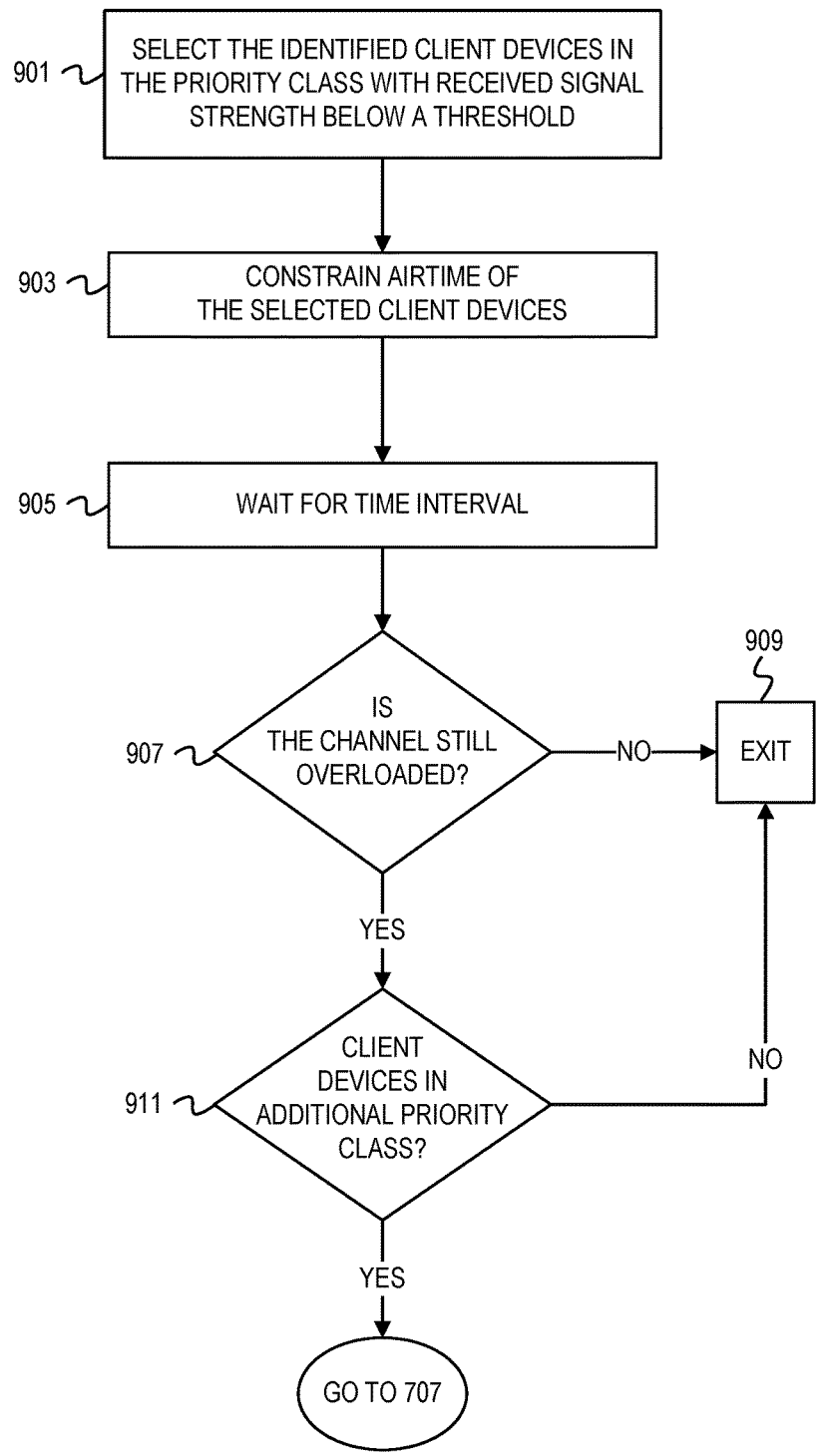
FIG. 9 depicts a flowchart of example operations for relieving the overloaded channel, according to some embodiments.

FIGS. 7-9 depict a flowchart of example operations for steering of the client traffic to load balance client traffic when a path is overloaded. The flowchart of FIGS. 7-9 depicts another embodiment of the flowchart of FIG. 6. However, as referenced above, certain blocks of the flowchart of FIGS. 7-9 may implement individual blocks of the flowchart of FIG. 6.

FIG. 7 depicts a part of a flowchart showing example operations for identifying and organizing the client devices associated with an overloaded channel.

At block 701, an AP detects an overloaded channel. The overloaded channel may be any channel that is used in communicating between the devices of FIG. 1.

At block 703, the AP prevents new associations with the overloaded channel. In one embodiment, the AP may set a flag that blocks future association of a client device with the overloaded channel. The AP may reset or remove the flag after the channel is no longer overloaded. In other embodiments, the AP may indicate the overloaded channel using a register, an entry in a data structure associated with the overloaded channel, an entry in a data structure of a device associated with the overloaded channel, etc.

At block 705, the AP prioritizes client devices that are already associated with the overloaded channel. The AP may prioritize client devices based on a perceived traffic sensitivity to disruption. The perceived traffic sensitivity may be based on heuristics, administrator settings, etc. The AP may prioritize client devices based on an indicated traffic sensitivity to disruption. The indicated traffic sensitivity may be indicated in messages, such as message headers. Client devices with traffic sensitivity indicated as high (e.g., client devices that host a real time application) may be classified as having high priority. Client devices with traffic sensitivity indicated as being low may be classified as having low priority. The AP may also determine the priority based on a comparison of a traffic sensitivity to a traffic sensitivity threshold.

At block 707, the AP begins operations for the different priority classes, starting from the lowest priority class. Thus, the AP may begin operations for client devices of a first class, which are less sensitive to disruption than client devices of a second class. The priority class of block 707 may be incremented each time control passes from block 911. At block 709, the AP begins operations for the client device in the priority class. The priority class of block 709 is determined by block 707.

At block 711, the AP determines airtime consumed by the client device on the overloaded channel. The airtime used by the client device in each channel may be maintained by each AP in a path across that channel. The determined airtime is computed as a sum of the airtime maintained at each AP in the path. If the path for the client device traverses different channels, the consumed airtime may not include the airtime consumed on the channels other than the overloaded channel.

At block 713, the AP determines if there is an additional client device in the priority class. If there is another client device in the priority class, then control returns back to block 709. Otherwise, control proceeds to block 715.

At block 715, the AP identifies those client devices that are capable of a least disruptive steering, relative to other possible steering techniques for the client devices. For instance, the AP identifies those of the client devices that are IEEE 802.11v compliant, i.e., client devices that implement the transition management feature described above with reference to FIG. 2. For the identified client devices, the AP may use BSS transitioning to steer the client traffic. Control continues from block 715 to block 801 if at least client device is identified. If no client devices are identified, then at block 717 the AP identifies those of the clients that are not capable of the least disruptive steering (e.g., are not IEEE 802.11v compliant). Control flows to block 801 from block 717.

FIG. 8 depicts a flowchart of example operations for steering client traffic for load balancing across paths.

At block 801, the AP begins operations for the identified client devices. In one embodiment, the AP may perform operations in decreasing order of consumed airtime. However, in another embodiment, the AP may perform operations in increasing order of consumed airtime. If control flows from block 715, the identified client devices are the client devices capable of least disruptive steering. If control flows from block 717, the identified client devices are not capable of least disruptive steering. The consumed airtime is a parameter that may be maintained by the AP for the channel.

At block 803, the AP determines alternate paths for the identified client device. Similar to determining candidate paths, the AP may determine alternate paths based on topographical data and communication capability of the client device. The alternate paths may not have non-established links.

At block 805, the AP forecasts airtime to be consumed by the identified client device for each alternate path. The AP may forecast the airtime based, at least in part, on channels of the alternate path and/or an average bandwidth of the client device over a certain window of time.

At block 807, the AP determines whether to steer the client device based on the forecasted airtime and a consumed airtime by the client device. The consumed airtime indicates the actual airtime consumed by the client device. If no alternate path exists, then the client device traffic is not steered. No alternate path may exist if no other AP is in range of the client device. The AP may not steer the client traffic if the forecasted airtime is greater than the consumed airtime. If the client traffic is not steered, then control returns to block 801. If the AP determines that the client traffic is to be steered, then control flows to block 809.

At block 809, the AP steers the traffic of the client device to the alternate path with the least forecasted airtime. The AP may steer the client traffic as described with reference to the description of the traffic manager 213 of FIG. 2. In some embodiments, the traffic manager 213 may use both a transition management feature and blacklist steering when steering the client traffic.

At block 811, the AP waits for a time period. The time period may be predefined for the AP or for the client device. Alternatively, the time period may be dynamically determined, such as based on the available bandwidths and/or the forecasted and/or consumed airtime for the client device.

At block 815, the AP determines whether the overloaded channel remains overloaded. After the time period, the AP may recalculate channel availability of the overloaded channel. If the channel is still overloaded, then control flows to block 817. If not, then control flows to block 813 where the AP exits the operations of the flowchart of FIG. 8.

At block 817, the AP determines whether there are additional identified client devices. Since the channel is still overloaded, the AP continues to steer client traffic off of the overloaded channel. If there are additional identified client devices, then control flows to block 801. If there are no additional identified client devices, then control flows to block 901 of FIG. 9.

FIG. 9 depicts a flowchart of example operations for relieving the overloaded channel. If the channel is still overloaded after attempting to steer the traffic of the client device, then the AP may attempt to alleviate the channel with airtime constraint.

At block 901, the AP uses received signal strength to select client devices. The AP selects the identified client devices in the current priority class that have a received signal strength at or below a defined threshold. The received signal strength for these client devices may be measured or looked up from a previous measurement.

At block 903, the AP constrains the airtime of the client devices. The AP may begin to throttle use of the overloaded channel by the client devices. The constraining action may cause one or more of the client devices to disconnect.

At block 905, the AP waits for a time interval. The time interval may be static or dynamic. For example, the time interval may initially be set by the AP to a default interval and later modified by a network administrator as desired. With respect to a dynamic time interval, the time interval may vary with the state of the overloaded channel and/or the wireless network. The time interval for waiting may be selected from multiple time intervals defined for different thresholds of client devices associated with the overloaded channel. As another example, the time interval may be a function of any of number of associated client devices, overall network traffic, number of APs in the wireless network etc.

At block 907, the AP determines whether the channel is still overloaded. The AP may recalculate channel availability of the overloaded channel after the time interval of block 905. If the channel is still overloaded, then control flows to block 911. If the channel is not overloaded, then control flows to block 909 where the AP exits the operations of the flowchart of FIG. 9.

At block 911, the AP determines whether there are additional client devices associated with the overloaded channel in another priority class. If there is another priority class of client devices, then control flows to block 707 of FIG. 7. If not, then control flows to block 909 where the AP exits the operations of the flowchart of FIG. 9.

In one aspect, the flowcharts of FIGS. 3-5 are directed to client-geared based techniques. In another aspect, the flowcharts of FIGS. 6-9 are directed to network-geared based techniques. The client-geared based techniques are directed to load-balancing the channels and/or paths of a client device, without regard to the overall wireless network traffic. The network-geared based techniques are directed to load-balancing the channels and/or paths of the wireless network, without regard to the traffic requirements of the client devices on that wireless network. The AP may switch between the client-geared based techniques to the network-geared based techniques if the overall wireless network traffic suffers due to load-balancing of a certain client device.

The flowcharts depicted herein are for illustrative purposes to aid in understanding this disclosure, and should not be used to limit any claims. Additional operations or fewer operations than those depicted may be performed. Further, the depicted operations may occur in a different order, in parallel, etc.

When describing an AP as "configured to" perform a function, this includes various possibilities. An AP may be programmed to perform a function. An AP may be designed with hardware that performs a function. An AP may be both designed with hardware components and programmed to perform a function. As an example, an AP may have an automatic gain control that measures received signal strength and program instructions to estimate signal strength.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium (also referred to as a machine-readable medium) may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that may communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, a dynamic programming language such as Python, a scripting language such as Perl programming language or PowerShell script language, and procedural programming languages such as the "C" programming language, etc. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create components for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
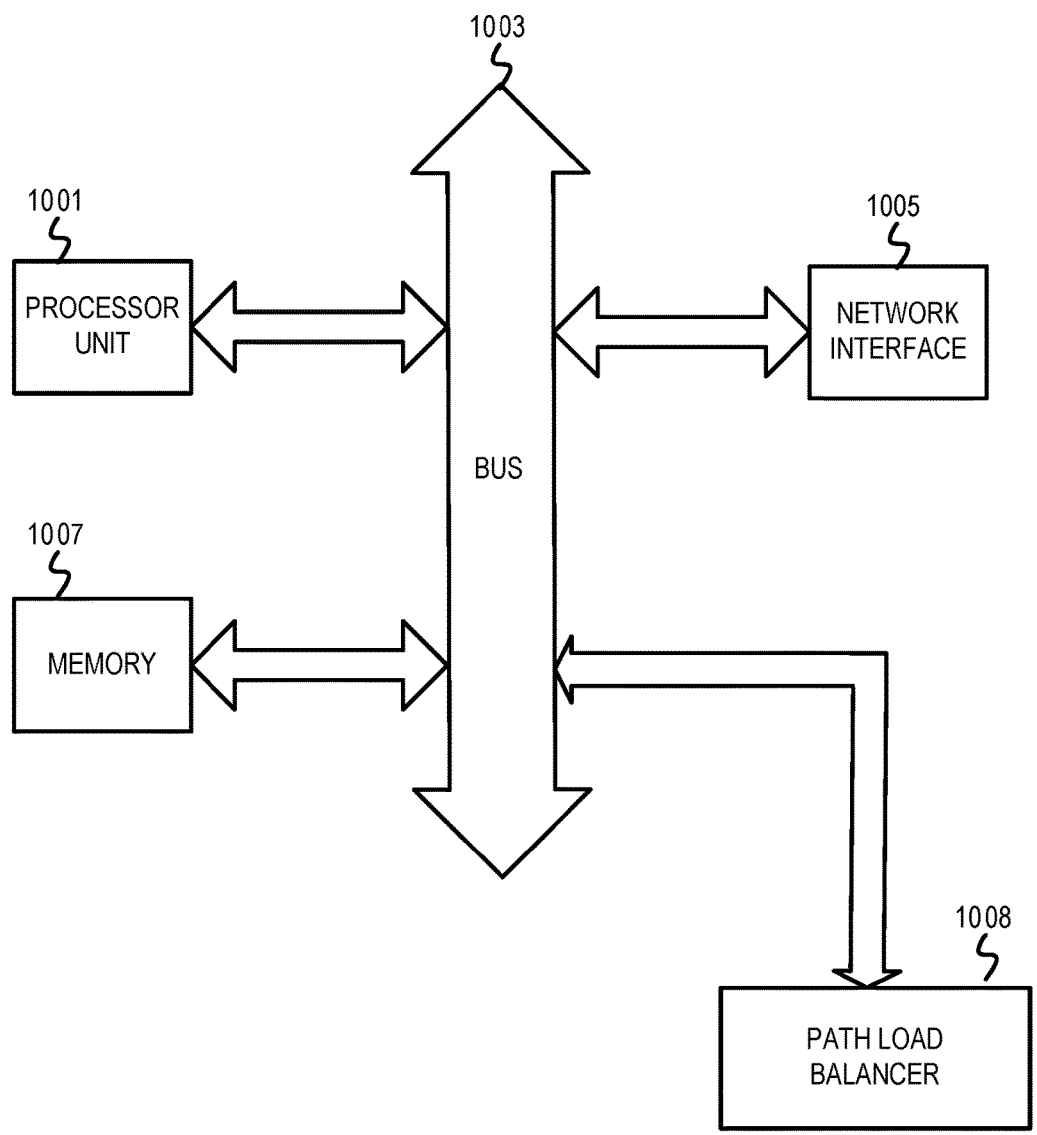
FIG. 10 depicts an example network device with a path load balancer, according to some embodiments.

FIG. 10 depicts an example network device with a path load balancer 1008, which may implement the path load balancer 215 of FIG. 2. A network device includes a processor unit 1001 (possibly including multiple processors, multiple cores, multiple nodes, and/or implementing multithreading, etc.). The network device includes memory 1007.

The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device also includes a bus 1003 (e.g., PCI, ISA, PCI-Express, HyperTransport® bus, InfiniBand® bus, NuBus, etc.), a network interface 1005 (e.g., a wireless LAN (WLAN) interface, a Bluetooth® interface, a WiMAX interface, a ZigBee® interface, a Wireless Universal Serial Bus (USB) interface, etc.) and a wired network interface (e.g., an Ethernet interface, a powerline communication interface, etc.). In some implementations, the network device may support multiple network interfaces—each of which is configured to couple the network device to a different communication network.

The path load balancer 1008 determines candidate paths to which the network device may steer the traffic of the client device. The path load balancer 1008 may select a client device based on a selection criterion, periodic selection, overload correction, etc. After determining the candidate paths, the path load balancer 1008 derives an available bandwidth for each of the candidate paths. The available bandwidth per path is derived from received signal strength values for links of the candidate path. The path load balancer 1008 then steers traffic of a client device based on the available bandwidths. The path load balancer 1008 may perform any of the previously described functions for load balancing wireless traffic across paths, including paths of different bands. Any one of these functionalities may be partially (or entirely) implemented in hardware and/or on the processor unit 1001. For example, the functionality may be implemented with an application specific integrated circuit, in logic implemented in the processor unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the memory 1007, and the network interface 1005 are coupled to the bus 1003. Although illustrated as being coupled to the bus 1003, the memory 1007 may be coupled to the processor unit 1001.

While the embodiments are described with reference to various implementations and exploitations, it will be understood that these embodiments are illustrative and that the scope of the claims is not limited to them. In general, techniques for load balancing traffic across paths as described herein may be implemented with facilities operable with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the example configurations may be implemented as a combined structure or component. Similarly, structures and functionality presented as a single component may be implemented as separate components. These and other variations, modifications, additions, and improvements may fall within the scope of the claims.

What is claimed is:

1. A method of load balancing network traffic, comprising:
   determining, by an access point (AP), a plurality of client devices that are associated with an overloaded channel of a wireless network;
   identifying a first client device of the plurality of client devices based, at least in part, on an airtime consumed on the overloaded channel;
   determining a plurality of alternate paths between the AP and the first client device;
   forecasting, by the AP, airtime to be used by the first client device on each of the plurality of alternate paths;
   determining, by the AP, a first alternate path of the plurality of alternate paths with a least forecasted airtime associated with the first client device;
   determining, by the AP, the forecasted airtime to be used by the first client device on the first alternate path is less than a consumed airtime of the first client device on the overloaded channel; and
   steering, by the AP, wireless network traffic of the first client device to the first alternate path based, at least in part, on a determination that the forecasted airtime to be used by the first client device on the first alternate path is less than the consumed airtime of the first client device on the overloaded channel.

2. The method of claim 1, further comprising:
   detecting the overloaded channel of the wireless network;
   determining the airtime on the overloaded channel consumed by each of the plurality of client devices; and
   determining the first client device consumes the most airtime on the overloaded channel,
   wherein identifying the first client device is based, at least in part, on determining the first client device consumes the most airtime on the overloaded channel.

3. The method of claim 1, further comprising:
   preventing new associations with the overloaded channel after detecting the overloaded channel.

4. The method of claim 1, further comprising:
   determining whether the overloaded channel remains overloaded after steering the wireless network traffic of the first client device;
   in response to determining the overloaded channel remains overloaded,
       identifying a second client device of the plurality of client devices that are associated with the overloaded channel based, at least in part, on the airtime consumed on the overloaded channel; and
       determining one or more alternate paths between the AP and the second client device for steering wireless network traffic of the second client device away from the overloaded channel.

5. The method of claim 1, wherein steering the wireless network traffic of the first client device to the first alternate path, further comprises:
   placing at least a second alternate path of the plurality of alternate paths on a blacklist.

6. The method of claim 1, further comprising:
   differentiating the plurality of client devices that are associated with the overloaded channel into a first class and a second class based, at least in part, on priorities associated with the plurality of client devices, wherein client devices of the first class have lower priorities compared to client devices of the second class; and
   determining the airtime on the overloaded channel consumed by each of the client devices of the first class including the first client device,
   wherein identifying the first client device is based, at least in part, on the airtime on the overloaded channel consumed by each of the client devices of the first class.

7. The method of claim 6, wherein the client devices of the first class are less sensitive to disruption from steering of wireless network traffic than the client devices of the second class.

8. The method of claim 6, further comprising:
   determining whether the overloaded channel remains overloaded after steering the wireless network traffic of the first client device of the first class;
   in response to determining the overloaded channel remains overloaded,
       identifying a second client device of the client devices of the first class based, at least in part, on the airtime on the overloaded channel consumed by each of the client devices of the first class; and
       steering wireless network traffic of the second client device of the first class away from the overloaded channel.

9. The method of claim 6, further comprising:
   steering wireless network traffic of each of the client devices of the first class away from the overloaded channel;
   determining whether the overloaded channel remains overloaded after steering the wireless network traffic of each of the client devices of the first class away from the overloaded channel; and
   steering wireless network traffic of at least one client device of the second class in response to determining the overloaded channel remains overloaded after steering the wireless network traffic of each of the client devices of the first class away from the overloaded channel.

10. The method of claim 1, further comprising:
    determining whether the overloaded channel remains overloaded after steering the wireless network traffic of the first client device, wherein the first client device is associated with a first class of client devices;
    in response to determining the overloaded channel remains overloaded,
        selecting one or more client devices of the first class that are associated with a receive signal strength measurement that is less than a threshold; and
        limiting the airtime on the overloaded channel consumed by the one or more client devices of the first class.

11. A network device comprising:
    a processor; and
    a memory having instructions stored therein which, when executed by the processor, cause the network device to:
        determine a plurality of client devices that are associated with an overloaded channel of a wireless network;
        identify a first client device of the plurality of client devices based, at least in part, on an airtime consumed on the overloaded channel;
        determine a plurality of alternate paths between the network device and the first client device;
        forecast airtime to be used by the first client device on each of the plurality of alternate paths;
        determine a first alternate path of the plurality of alternate paths with a least forecasted airtime associated with the first client device;

determine the forecasted airtime to be used by the first client device on the first alternate path is less than a consumed airtime of the first client device on the overloaded channel; and steer wireless network traffic of the first client device to the first alternate path based, at least in part, on a determination that the forecasted airtime to be used by the first client device on the first alternate path is less than the consumed airtime of the first client device on the overloaded channel.

12. The network device of claim 11, wherein the instructions when executed by the processor, further cause the network device to:

detect the overloaded channel of the wireless network;
determine the airtime on the overloaded channel consumed by each of the plurality of client devices;
determine the first client device consumes the most airtime on the overloaded channel; and
identify the first client device based, at least in part, on a determination that the first client device consumes the most airtime on the overloaded channel.

13. The network device of claim 11, wherein the instructions when executed by the processor cause the network device to steer the wireless network traffic of the first client device to the first alternate path further comprise instructions when executed by the processor, cause the network device to:

place at least a second alternate path of the plurality of alternate paths on a blacklist.

14. The network device of claim 11, wherein the instructions when executed by the processor, further cause the network device to:

differentiate the plurality of client devices that are associated with the overloaded channel into a first class and a second class based, at least in part, on priorities associated with the plurality of client devices, wherein client devices of the first class have lower priorities compared to client devices of the second class;
determine the airtime on the overloaded channel consumed by each of the client devices of the first class including the first client device; and
identify the first client device based, at least in part, on the airtime on the overloaded channel consumed by each of the client devices of the first class.

15. The network device of claim 14, wherein the instructions when executed by the processor, further cause the network device to:

determine whether the overloaded channel remains overloaded after steering the wireless network traffic of the first client device of the first class;
in response a determination that the overloaded channel remains overloaded,
 identify a second client device of the client devices of the first class based, at least in part, on the airtime on the overloaded channel consumed by each of the client devices of the first class; and
 steer wireless network traffic of the second client device of the first class away from the overloaded channel.

16. The network device of claim 14, wherein the instructions when executed by the processor, further cause the network device to:

steer wireless network traffic of each of the client devices of the first class away from the overloaded channel;
determine whether the overloaded channel remains overloaded after steering the wireless network traffic of each of the client devices of the first class away from the overloaded channel; and
steer wireless network traffic of at least one client device of the second class in response to a determination that the overloaded channel remains overloaded after steering the wireless network traffic of each of the client devices of the first class away from the overloaded channel.

17. A network device comprising:

means for determining a plurality of client devices that are associated with an overloaded channel of a wireless network;
means for identifying a first client device of the plurality of client devices based, at least in part, on an airtime consumed on the overloaded channel;
means for determining a plurality of alternate paths between the network device and the first client device;
means for forecasting airtime to be used by the first client device on each of the plurality of alternate paths;
means for determining a first alternate path of the plurality of alternate paths with a least forecasted airtime associated with the first client device;
means for determining the forecasted airtime to be used by the first client device on the first alternate path is less than a consumed airtime of the first client device on the overloaded channel; and
means for steering wireless network traffic of the first client device to the first alternate path based, at least in part, on a determination that the forecasted airtime to be used by the first client device on the first alternate path is less than the consumed airtime of the first client device on the overloaded channel.

18. The network device of claim 17, further comprising:

means for detecting the overloaded channel of the wireless network;
means for determining the airtime on the overloaded channel consumed by each of the plurality of client devices;
means for determining the first client device consumes the most airtime on the overloaded channel; and
means for identifying the first client device based, at least in part, on determining the first client device consumes the most airtime on the overloaded channel.

19. The network device of claim 17, further comprising:

means for differentiating the plurality of client devices that are associated with the overloaded channel into a first class and a second class based, at least in part, on priorities associated with the plurality of client devices, wherein client devices of the first class have lower priorities compared to client devices of the second class;
means for determining the airtime on the overloaded channel consumed by each of the client devices of the first class including the first client device; and
means for identifying the first client device based, at least in part, on the airtime on the overloaded channel consumed by each of the client devices of the first class.

20. The network device of claim 19, further comprising:

means for determining whether the overloaded channel remains overloaded after steering the wireless network traffic of the first client device of the first class;
in response to determining the overloaded channel remains overloaded,
 means for identifying a second client device of the client devices of the first class based, at least in part, on the airtime on the overloaded channel consumed by each of the client devices of the first class; and means for steering wireless network traffic of the second client device of the first class away from the overloaded channel.

\* \* \* \* \*